United States Patent [19]

Marsi

[11] 4,448,428
[45] May 15, 1984

[54] MECHANICAL SEAL ASSEMBLY

[75] Inventor: Joseph A. Marsi, R. Palos Verdes, Calif.

[73] Assignee: Borg-Warner Corporation, Chicago, Ill.

[21] Appl. No.: 346,812

[22] Filed: Feb. 8, 1982

[51] Int. Cl.³ .............................................. F16J 15/34
[52] U.S. Cl. ......................................... 277/92; 277/41; 277/65
[58] Field of Search ................................. 277/38–43, 277/65, 81 R, 96.1, 96 R, 92

[56] References Cited

U.S. PATENT DOCUMENTS

| | | | |
|---|---|---|---|
| 2,937,042 | 5/1960 | Wilder | 287/126 |
| 3,421,783 | 1/1969 | Sakai | 287/52.05 |
| 3,554,559 | 1/1971 | Dahlheimer | 277/41 |
| 3,628,799 | 12/1971 | Wiese | 277/27 |
| 3,933,012 | 1/1976 | Ketchum | 64/23 |
| 4,109,920 | 8/1978 | Wiese | 277/65 |
| 4,172,678 | 10/1979 | Schonwald et al. | 403/267 |
| 4,239,241 | 12/1980 | Menager | 277/92 |
| 4,256,313 | 3/1981 | Arnold | 277/92 |
| 4,351,533 | 9/1982 | Moore | 277/92 |

*Primary Examiner*—Robert I. Smith
*Attorney, Agent, or Firm*—Aubrey L. Burgess

[57] ABSTRACT

An improved mechanical seal assembly comprising a generally stationary seal ring and rotatable seal ring, each with opposed seal faces, the stationary seal ring being connected to a stationary housing by elastomeric keys. One of said seal rings is constructed of a material such as a carbon graphite composition which is more brittle than the other which is constructed of a much harder less brittle material. As in most seals of this character, the seal faces are lubricated by a fluid film flowing radially across the opposing faces. In the absence or upon failure of the film, the rings can seize, generally resulting in a breakage of or other damage to the more brittle seal ring. However, the elastomeric connecting keys provide a cushion for absorbing dynamic forces in the tangential direction, to distribute bearing loads substantially evenly and to allow radial deflections of the stationary seal ring relative to the housing due to thermal and pressure effects.

2 Claims, 2 Drawing Figures

MECHANICAL SEAL ASSEMBLY

BACKGROUND OF THE INVENTION

1. Field of the Invention

The invention to be described relates to mechanical seal assemblies which generally comprise a stationary seal ring and a rotatable seal ring, each seal ring having a seal face, with resilient means for urging the rings toward one another. The seal assembly further includes an improved key or anchoring device for securing the stationary seal ring to a housing. Seals of this type are generally classified in Class 277—Joint Packing—Subclass 136.

2. Description of the Prior Art

In mechanical seal assemblies of the type described above, it is common practice to connect the stationary seal ring to a housing by a metal key received in registering keyways in the stationary seal ring and the housing. An example of such an arrangment is described in U.S. Pat. No. 3,628,799 granted Dec. 21, 1971, to W. J. Wiese and assigned to the same assignee as this application.

In the typical seal assembly, one of the seal rings is made of a brittle material, such as various carbon-graphite materials which combine the strength, hardness and wear resistance of carbon with the natural lubricity, higher thermal conductivity, dimensional stability and machinability of graphite. The other seal ring is constructed of an even harder, but less brittle material such as tungsten, various ferrous alloys and the like. Most mechanical seals operate with a fluid film between the seal faces; and in the absence of this film, which acts as a lubricant between the relatively rotating faces, the rings can seize, resulting in a breakage of one of the seal rings, usually the ring constructed of the more brittle material.

It should be noted that the prior art also teaches the use of resilient means for coupling two members which rotate together. Examples of such couplings can be found in U.S. Pat. Nos. 3,987,042; 3,421,783 and 4,172,678. In the present invention, the resilient material is used to secure a stationary seal ring within an associated housing.

SUMMARY OF THE INVENTION

In the usual mechanical seal construction in which this invention is used, the seal rings are resiliently urged toward one another. One seal ring is constructed of a relatively brittle material, such as various carbon-graphite compositions which differ in their ability to withstand elevated temperatures, while the other seal ring is constructed of a very hard, but less brittle material, such as cobalt-chromium-tungsten alloys (e.g. "Stellite"), corrosion resistant austenitic cast iron (e.g. "Ni-Resist"), tungsten carbide and various steel alloys. Generally in such mechanical seal assemblies, the opposing seal faces are lubricated by a fluid film flowing radially across the faces. In the event such flow ceases or other failure of the lubricating film, the faces can seize, resulting in the cracking or breakage of the more brittle seal ring.

In the present invention, the stationary seal ring is connected to a housing by means of elastomeric keys, or other anchoring means, which absorb shock, protecting the brittle seal ring and greatly reducing the risk of cracking or other damage caused by seizure of the seal rings.

The elastomeric key connecting means of this invention are designed to absorb the rotary, dynamic forces acting in such a situation. In a preferred embodiment, the elastomer is selected from the usual elastomers used for O-rings and various gaskets which are selected for not only their usable temperature range, but their chemical resistance to the fluids to which they will be exposed. These properties are well known to those skilled in the mechanical seal art and are found in various standards for mechanical seals.

DESCRIPTION OF THE PREFERRED EMBODIMENT

Figure 1:
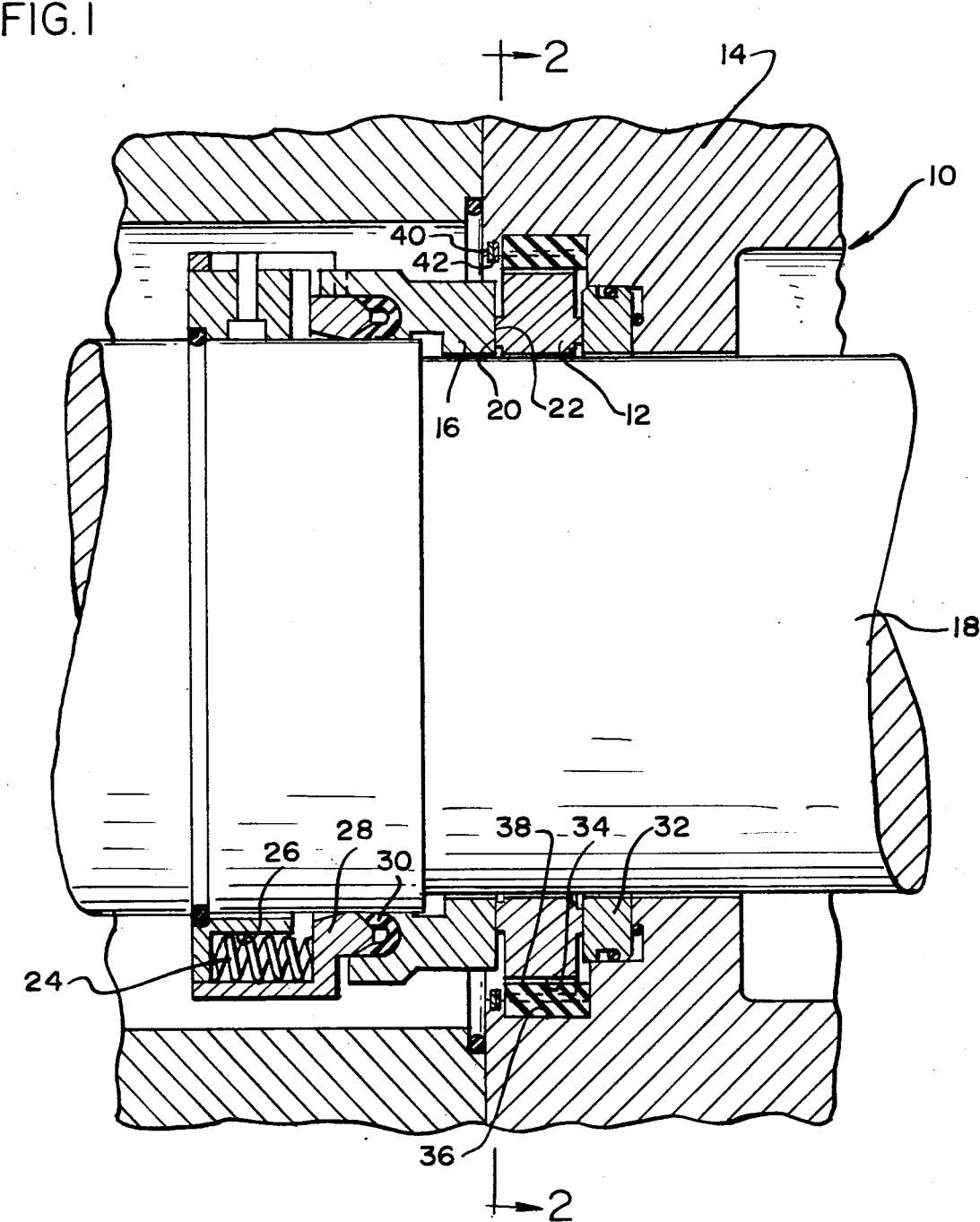
FIG. 1 is a longitudinal sectional view on line 1—1 of FIG. 2 through a mechanical seal assembly constructed according to this invention.
Figure 2:
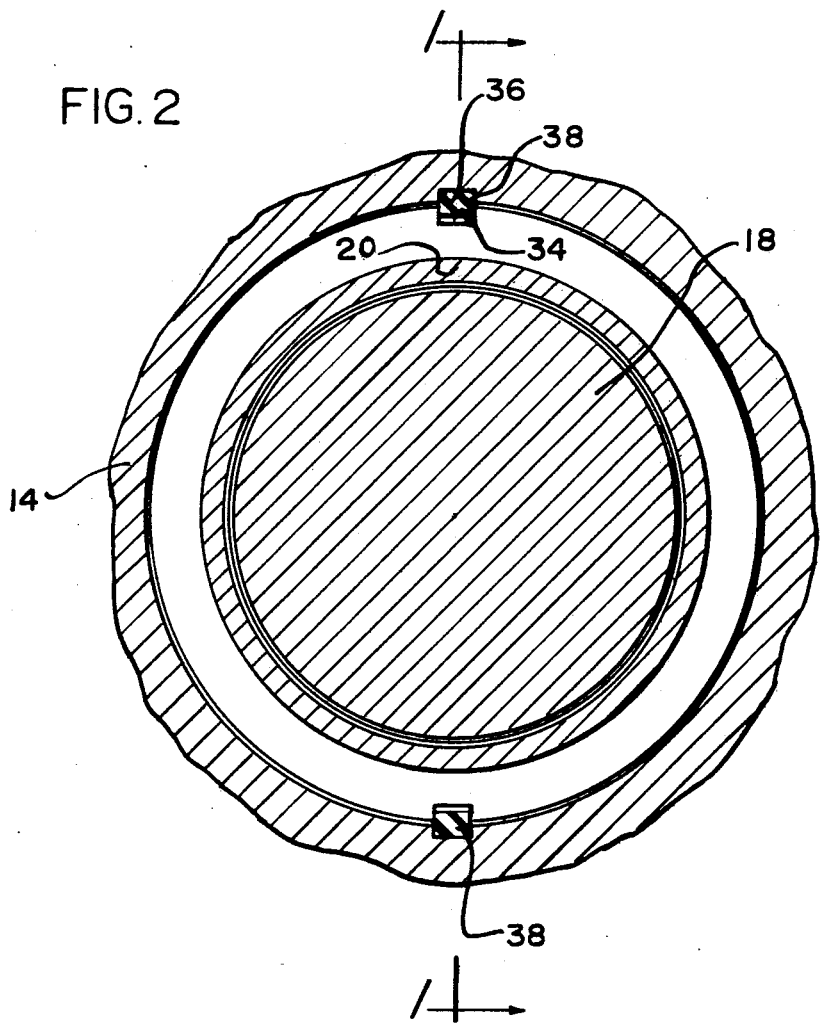
FIG. 2 is a sectional view taken on line 2—2 of FIG. 1.

FIG. 1 illustrates a mechanical seal assembly 10 comprising a stationary seal ring 12 connected to a housing 14 and a rotary seal ring 16 connected to a shaft 18. The rings 12 and 16 are constructed of conventional seal ring materials and have opposing seal faces 20, 22, respectively. The rings 12 and 16 are urged toward one another by coil springs 24 received in spring pockets 26 in an expander ring 28 through an elastomer U-cup 30. The expander ring 28 is connected to the shaft and is constructed to drive the seal ring 16. A back-up ring 32 is located at the rear of the seal ring 12. One or the other of the seal rings 12 or 16 is usually made of a relatively brittle material, such as a carbon-graphite composition. These carbon-graphite compositions are available from various suppliers with a wide range of properties, depending on the particular binders, fillers and manufacturing processes used. For seal face applications, they are usually selected on the basis of the recommended temperature range for the service in which the seal is used.

The other seal ring is made of a much harder and less brittle material. Examples of such materials include: Stellite (a cobalt-chromium-tungsten alloy); Ni-Resist (a corrosion resistant austenitic cast iron); tungsten carbide; boron carbide; manganese bronze/sapphire; 440 stainless; 316 stainless; and a wide variety of alloy tool steels. The use of these materials is well known in the art.

Generally, the opposing seal faces are lubricated by a film of fluid flowing radially across the faces. This construction is described in more detail in the aforementioned Wiese patent, which description is incorporated herein by reference. If the flow of such film is interrupted or it otherwise loses its lubricating properties, such as by contamination, there is a high probability that the seal rings will seize and, as mentioned above, the more brittle of the two rings will break or crack.

In order to avoid these consequences, the stationary seal ring is secured to the housing by means which can absorb the shock induced by seizure and protect the seal rings against damage thereby. To illustrate, the seal ring 12 is constructed with one or more keyways 34 at its periphery, and the housing 14 is constructed with a like number of complementary keyways 36 which are radially spaced to align with the keyways 34. The keyways 34 and 36 have generally alike radial and lateral dimensions.

An elastomeric key 38 is received in the aligned keyways 34 and 36 and is retained axially therein by one or more snap rings 40 received in a groove 42 in the housing. The elastomer can be synthetic rubber and the like and can be selected from various elastomeric materials, such as neoprene (polymers based on 2-chlorobutadiene 1,3), Viton (a fluoroelastomer), nitrile rubbers, ethylene-propylene rubbers, and similar materials used in the mechanical seal art on the basis of temperature and fluid resistance.

The keys 38 thus provide a resilient contact between the housing and the stationary seal ring and thus provide a cushion for absorbing dynamic forces in the tangential direction, especially if the faces begin to seize due to the absence or failure of the lubricating film between the seal faces. The keys also distribute bearing loads evenly and can prevent the breakage or rupture of seal rings made of brittle materials. The keys allow radial deflections of the stationary seal ring relative to the housing due to thermal and pressure effects without friction by deflecting readily under shear loads.

While the invention has been described in connection with elongated keys, it should be understood that the shape is not critical and may take the form of pins, discs and other geometries.

I claim:

1. A mechanical seal assembly for separating two fluids and comprising:
   a housing;
   a rotatable shaft in said housing and surrounded by said housing;
   a stationary seal ring in and connected to said housing, said stationary seal ring surrounding said shaft;
   a rotatable seal ring surrounding and connected to said shaft;
   said seal rings having opposed seal faces lubricated by a film of one of said fluids flowing thereacross;
   spring means urging one seal ring axially toward the other;
   one seal ring being of a relatively brittle material and the other seal ring being of a less brittle material;
   at least one axially elongated keyway in said housing positioned to overlie said stationary seal ring;
   at least one axially elongated complimentary keyway in an outer portion of said stationary seal ring in radial alignment with the keyway in said housing; and
   a generally rectangular-sectioned, axially elongated, elastomer key in said keyways forming the connection between said housing and said stationary seal ring, said elastomer key being distortable to substantially prevent breakage and similar damage to said relatively brittle seal ring in the event of failure of said fluid film flowing across said seal faces.

2. A mechanical seal assembly as recited in claim 1, in which said relatively brittle seal ring is constructed of a carbon-graphite compostion.

* * * * *